United States Patent Office 3,766,204
Patented Oct. 16, 1973

3,766,204
OXYALKYLATED DERIVATIVES OF
GLYCOLURILS
Chempolil T. Mathew, Dover Hills, Harry E. Ulmer,
Morristown, Edwin D. Little, Convent Station, and
Omer E. Curtis, Jr., Morristown, N.J., assignors to
Allied Chemical Corporation, New York, N.Y.
No Drawing. Filed June 18, 1971, Ser. No. 154,693
Int. Cl. C07d 49/30
U.S. Cl. 260—309.7                          11 Claims

ABSTRACT OF THE DISCLOSURE

Oxyalkylated derivatives of glycoluril and substituted glycolurils are prepared by hydroxyalkylation with 1,2-epoxides in the presence of a suitable catalyst. The compounds are useful to prepare polyesters, alkyd resins, and polyurethanes and as lubricants and surface active agents.

---

This invention relates to novel derivatives of glycoluril and 7-substituted and/or 8-substituted glycolurils. More particularly, this invention relates to hydroxyalkylated derivatives of glycoluril and 7-substituted and/or 8-substituted glycolurils and method for preparing them.

SUMMARY OF THE INVENTION

The compounds of the invention have the formula:

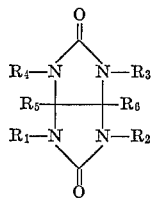

wherein $R_1$, $R_2$, $R_3$ and $R_4$ are independently hydrogen-terminated oxyalkylene chains containing one or more units of the formula

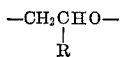

wherein R is hydrogen, alkyl or aryl of up to 10 carbon atoms, preferably of 1–6 carbon atoms, and $R_5$ and $R_6$ independently are hydrogen, alkyl, aryl, alkaryl or aralkyl, preferably of up to 8 carbon atoms. The compounds most preferred in the invention are those wherein R, $R_5$ and $R_6$ are selected from the group consisting of hydrogen and methyl. These compounds are prepared by hydroxyalkylation of glycoluril or its substituted derivatives with a 1,2-epoxide in the presence of a suitable catalyst. They are useful as constituents in resins such as polyesters, alkyds and polyurethanes and as lubricants and surface active agents.

DETAILED DESCRIPTION OF THE INVENTION

The compounds of the invention are prepared by reacting glycoluril or its substituted derivatives with at least four mols of a 1,2-epoxide at elevated temperatures, in the presence of a catalyst.

At least 4 mols of 1,2-epoxide will be required per mol of glycoluril. An excess of the 1,2-epoxide will produce higher molecular weight products. Mixtures of 1,2-epoxides can be employed, and block copolymers can be prepared by alternate addition of different 1,2-epoxides up to the desired molecular weight, up to 1000 of each oxyalkylene unit in a chain.

Suitable 1,2-epoxides for use in the invention include alkylene oxides, preferably of 1 to 10 carbon atoms, such as ethylene oxide, propylene oxide, butylene oxide and the like; and aryl-substituted oxides such as styrene oxide and the like. The preferred alkylene oxides are ethylene oxide and propylene oxide.

The reaction is preferably carried out in the presence of a solvent. The solvent must be inert to the reactants, should be a solvent for the product and preferably is a liquid under the reaction conditions. Suitable solvents include dimethylformamide, dioxane and the like. In the case where the product is a liquid, it can also act as a liquid media for the reaction.

The temperature of the reaction should be at least 50° C. in order to promote an economic rate of reaction but higher temperatures, preferably 100° C. up to about 150° C. or higher, can be employed. When the reactants are volatile at the reaction temperatures, the reaction is generally carried out under pressure. Autogenous pressures can be employed in a closed system, or higher pressures, up to about 500 p.s.i. can be employed. In the case of volatile 1,2-epoxides, such as ethylene oxide, the 1,2-epoxide can be added to the reaction incrementally so as to maintain the reaction conditions at a fairly constant level and to avoid the use of very high pressures, thereby necessitating the concomitant use of elaborate and expensive equipment.

The reaction is carried out in the presence of a catalyst. Suitable catalysts include alkali metal hydroxides, such as potassium hydroxide and sodium hydroxide, and the like; and tetraorganoammonium halides, such as tetramethylammonium chloride, benzyltrimethylammonium chloride, tetraethylammonium chloride, benzyltriethylammonium chloride, and the like. From 0.1 to 15% by weight of the glycoluril starting material, preferably 1 to 6% by weight, of the catalyst is generally employed.

The reaction is generally carried out in an inert atmosphere, such as argon, nitrogen and the like, to prevent side reactions and to ensure formation of a high purity product.

When the reaction is complete, the solution containing the product is filtered to remove the catalyst. The solvent can be removed in conventional manner, as by evaporation or distillation.

The compounds of the invention are useful as lubricants, as surface active agents and as monomers for the preparation of polymers such as polyesters, alkyd resins, and polyurethanes.

Polyurethanes are prepared by reacting a polyol with a polyisocyanate. The present compounds can be employed in the preparation of polyurethane foams as the sole polyol component or in admixture with conventional polyols by reaction with a polyisocyanate in the presence of conventional additives, including blowing agents, activators and catalysts, acid dispersing agents or emulsifiers and the like. The foams can be prepared readily by the one shot technique whereby a gas former, such as a volatile fluorocarbon or $CO_2$ generated by the reaction of water with the isocyanate functional group as blowing agent, is added together with the reactants.

The compounds of the invention can be employed as the sole polyol component, or can be admixed with known polyether glycols, triols and the like. Suitable known polyols for use in the invention include the reaction products of alkylene oxides with, for example, trimethylolpropane, propylene glycol, 1,2,6-hexane triol, pentaerythritol, sorbitol, glycerol, triethanolamine, diethylene triamine, ethylenediamine, methyl glycosides, sucrose and the like. These polyols generally have a hydroxy number in the range between 300–600, preferably 400–550.

Polyisocyanates useful in preparing polyurethanes are well known. Illustrative of suitable polyisocyanates are m-phenylenediisocyanate, 2,4 - tolylenediisocyanate, 2,6-tolylenediisocyanate, naphthalene-1,5-diisocyanate, methylenebis(4 - cyclohexylisocyanate), methylenebis(4-phenylisocyanate), 1,6-hexamethylenediisocyanate, 1,3,5-benzenetriisocyanate and the like. Mixtures of polyisocyanates can also be employed. Crude polyisocyanate mixtures are described in U.S. Pats. 3,316,286, 3,420,752, 3,341,462 and 3,359,295. These diisocyanates are undistilled phosgenation products of toluenediamine having viscosities of 20–10,000 cps. at 25° C. and amine equivalents of 90–130.

Suitable blowing agents useful in preparing polyurethane foams are well known and include fluorotrichloromethane, difluorodichloromethane, trifluorochloromethane, tetrafluorodichloroethane, difluorotetrachloroethane, difluoroethane, 1,1,1-trichlorodifluoroethane, methylene chloride and the like. These agents can be in liquid or vapor phase at room temperature but will be in vapor phase at polymerization temperatures. They are generally soluble in polyisocyanates and do not diffuse readily through the interstices of the foamed polymer. Generally from about 2–40% by weight of the polyol reactant of a blowing agent is added.

Although a catalyst is not required, a catalyst can be employed to increase the rate of reaction. Suitable catalysts or initiators for the reaction include tertiary amines such as triethylamine, N,N-dimethylethanolamine, N,N,N′,N′-tetramethyl-1,3-butanediamine, pyridine, quinoline, N-alkyl morpholines and the like. Organotin compounds can also be employed, such as dibutyltindiluarate, tributyltinoctanoate, bis(2-ethylhexyl)tin oxide, dibutyltin dichloride, tin hexanoate, stannous octoate, and the like. They can be employed in amounts of about 2–12% by weight of the polyol reactant and are generally added to the polyol prior to reaction with the polyisocyanate.

Conventional fillers can also be added with the reactants, including finely divided inert solids such as aluminum silicate, calcium carbonate, barium sulfate, kaolin, wood cellulose, copper phthalocyanine, cadmium selenide, carbon black, silica, titanium dioxide, mica, ferric oxides and the like as well as finely divided organic resins such as polystyrene or polyvinyl acetate.

Emulsifying agents can also be added to improve contact between the polyol and polyisocyanate reactants. These agents are also conventional and include siloxane-oxyalkylene block copolymers of the formula:

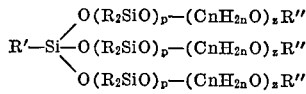

wherein R, R′ and R″ are alkyl groups of 1–18 carbon atoms, $p$ at each occurrence independently is an integer of 2–15, $z$ at each occurrence independently is an integer of 10–50 and $n$ is an integer from 1–6. One such copolymer is available commercially wherein R′ is ethyl, R is methyl, R″ is butyl, $p$ at each occurrence is 7 and $z$ at each occurence is 50. Other emulsifiers which can be employed include oil-soluble sulfonates, blends of polyalcohol carboxylic acid esters, polyethylene phenolethers and the like. These compositions are generally employed in concentrations of 0.02 to 1% by weight of the total weight of the reactants.

Other known additives, such as flame retardants, can also be added as will be known to one skilled in the art.

The general procedure employed for preparing the polyurethane foams of the invention is to mix together the polyol, blowing agent, and other ingredients if employed, and add the mixture to the polyisocyanate. The relative amounts of polyol and polyisocyanate can vary, but preferably an excess of the polyisocyanate will be present, such that the NCO:OH ratio is between about 0.9–1.5:1, preferably 1–1.3:1.

Polyurethanes prepared from the compounds of the invention can be prepared very rapidly to form fine celled foams having good insulating values.

The invention will be further illustrated by the following examples, but it is to be understood that the invention is not meant to be limited by the details disclosed therein. In the examples, parts and percentages are by weight unless otherwise noted.

EXAMPLE 1

To a stainless steel autoclave were charged 31.2 parts of 3a-methylglycoluril, 300 parts by volume of dimethylformamide and 1.0 part of sodium hydroxide. The autoclave was closed, flushed with nitrogen and 37.4 parts of ethylene oxide added. The temperature was brought to 100° C. and pressure increased to 125 p.s.i. with nitrogen. Stirring was continued for about 20 hours at 100° C. until no further pressure drop (due to consumption of ethylene oxide) was noted. The autoclave was cooled, and the resultant light brown solution filtered and the solvent removed under vacuum.

An essentially quantitative yield (66 parts) of N,N′,N″,N‴-tetrakis(2-hydroxyethyl)-3a-methylglycoluril of the formula:

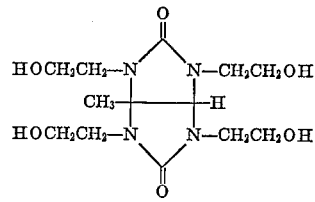

was obtained as a viscous, amber material having 21.55% hydroxyl (theoretical 20.48%).

Elemental analysis was as follows: Calculated for $C_{13}H_{24}O_6N_4$ (percent): C, 46.98; H, 7.23; N, 16.87. Found (percent): C, 46.41; H, 7.26; N, 17.70.

The structure was confirmed by infrared (hereinafter IR) and nuclear magnetic resonance (hereinafter NMR) analyses.

EXAMPLE 2

A mixture of 150 parts of 3a-methylglycoluril, 900 parts by volume of dioxane and 6 parts of tetramethylammonium chloride were charged to an autoclave and 175 parts of ethylene oxide added as in Example 1. The mixture was pressured to 170 p.s.i. with nitrogen and heated at 120° C. for 30 hours. The solution was cooled, filtered and the solvent removed under vacuum.

A quantitative yield (319 parts) of N,N′,N″,N‴-tetrakis(2-hydroxyethyl) - 3a - methylglycoluril as a light amber viscous liquid having 19.37% hydroxyl was obtained.

Elemental analysis was as follows: Found (percent): C, 47.38; H, 7.69; N, 17.12.

The structure was confirmed by IR and NMR analyses.

EXAMPLE 3

The procedure of Example 2 was followed charging a mixture of 50 parts of 3a-methylglycoluril, 65 parts of ethylene oxide, 300 parts by volume of dimethylformamide and 2 parts of benzyltrimethylammonium chloride as a 60% aqueous solution. Reaction was continued for 22 hours at 100° C. under 125 p.s.i. nitrogen pressure.

A quantitative yield (106 parts) of N,N′,N″,N‴-tetrakis(2-hydroxyethyl)-3a-methylglycoluril was recovered as in Example 2 as a very viscous, amber liquid having 19.76% hydroxyl.

EXAMPLE 4

One hundred twelve parts of propylene oxide were added to an autoclave containing a mixture of 50 parts of 3a-methylglycoluril, 300 parts by volume of dimethylformide and 2 parts of tetramethylammonium chloride. The autoclave was heated at 100° C. under nitrogen pressure of 125 p.s.i. for 20 hours when the temperature was raised to 150° C. and the pressure to 195 p.s.i. with nitrogen. Reaction was continued for about 7 hours and the autoclave cooled. The product was recovered as in Example 2.

A quantitative yield (161 parts) of N,N'-bis(2-hydroxypropyl)-N'',N'''-bis-[2(2-hydroxypropyl)propyl]-3a-methylglycoluril of the formula:

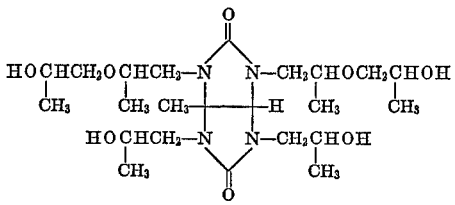

was obtained.

The compound was an amber colored viscous product having 13.28% hydroxyl.

Elemental analysis was as follows: Calculated for $C_{23}H_{44}O_8N_4$ (percent): C, 54.76; H, 8.73; N, 11.11. Found (percent): C, 53.40; H, 9.25; N, 9.20.

The structure was confirmed by IR and NMR analyses.

EXAMPLE 5

A mixture of 156 parts of 3a-methylglycoluril, 220 parts of N,N',N'',N'''-tetrakis(2-hydroxypropyl)-3a-methylglycoluril, 8 parts of benzyltriethylammonium chloride and 244 parts of propylene oxide were charged to an autoclave and heated at 150° C. for about 2 hours. Excess propylene oxide was removed.

An essentially quantitative yield of N,N',N'',N'''-tetrakis(2-hydroxypropyl)-3a-methylglycoluril was obtained as an amber colored product.

EXAMPLE 6

The product of Example 5 was recharged to the autoclave and 182 parts of propylene oxide added. Reaction at 150° C. was continued for 6 hours. After removal of excess propylene oxide the product obtained (about 700 parts) was a dark amber material containing 15.4% hydroxyl which had an apparent viscosity of about 32,000 cps. This product contained about 5 mols of propylene oxide per mol of 3a-methylglycoluril.

EXAMPLE 7

A mixture of 3.9 parts of 3a-methylglycoluril, 12 parts of styrene oxide, 50 parts by volume of dimethylformamide and 0.205 part tetramethylammonium chloride were charged to an autoclave, which was closed, heated to 100° C., and pressured with nitrogen to 125 p.s.i. The reaction was continued for about 22 hours, the autoclave cooled, the product filtered, and the solvent removed under vacuum.

N,N',N'',N'''-tetrakis(2-phenyl-2-hydroxyethyl)-3a-methylglycoluril was obtained as an orange-yellow solid having the formula:

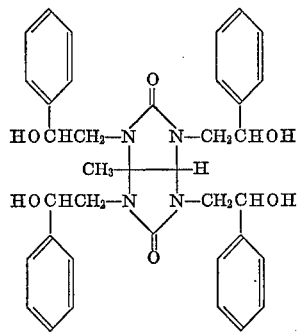

Elemental analysis was as follows: Calculated for $C_{37}H_{40}N_4O_6$ (percent): C, 68.91; H, 6.29; N, 8.81. Found (percent): C, 68.22; H, 6.77; N, 9.80.

The structure was confirmed by IR and NMR analyses.

EXAMPLE 8

Nineteen parts of N,N',N'',N'''-tetrakis(2-hydroxyethyl)-3a-methylglycoluril and one part of sodium hydroxide were added to an autoclave and heated under nitrogen to 145° C. Propylene oxide was added incrementally at such rate as to maintain the pressure within the range 180–220 p.s.i. until 1325 parts had been consumed (about 200 hours). The product was a light amber, viscous liquid. In the same manner, 205 parts of ethylene oxide were then added.

The resultant product was a block copolymer having a calculated molecular weight of 27,052. The product was a dull white, extremely viscous material having the formula:

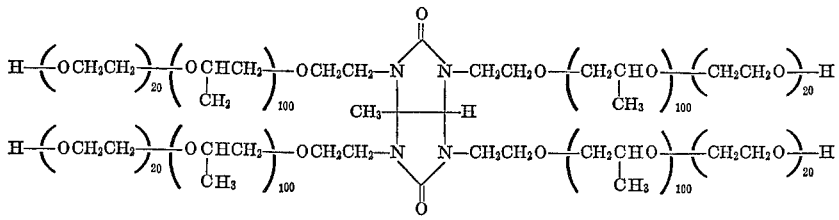

EXAMPLE 9

A mixture of 14.2 parts of glycoluril, 100 parts by volume of dimethylformamide, and 0.3012 parts of tetramethylammonium chloride were charged to an autoclave and 18 parts of ethylene oxide added as in Example 1. The pressure reached 110 p.s.i. at a temperature of 100° C. After about 90 minutes the pressure had dropped to 69 p.s.i. Reaction was continued for 17 hours, the autoclave was cooled, the product filtered, and the solvent removed under vacuum.

A quantitative yield of N,N',N'',N'''-tetrakis(2-hydroxyethyl)glycoluril having the formula:

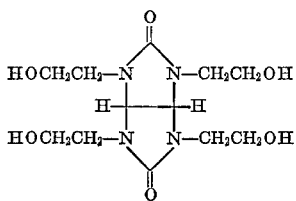

was obtained as a brown, viscous material.

Elemental analysis was as follows: Calculated for $C_{12}H_{22}O_6N_4$ (percent): C, 45.28; H, 6.92; N, 17.61. Found (percent): C, 47.29; H, 7.20; N, 16.00.

The structure was confirmed by IR and NMR analyses.

EXAMPLE 10

A mixture of 8.5 parts of 3a,6a-dimethylglycoluril, 100 parts by volume of dimethylformamide and 0.5 part of tetramethylammonium chloride were charged to an autoclave and 13.2 parts of ethylene oxide added as in Example 1. The pressure reached 135 p.s.i. at a temperature of 100° C. After 24 hours the pressure dropped to 108 p.s.i. and the autoclave was cooled, the product filtered and the solvent removed under vacuum.

A quantitative yield (21.6 parts) of N,N'-bis(2-hydroxyethyl) - N'',N''' - bis[2(2-hydroxyethoxy)ethyl]-3a, 6a-dimethylglycoluril having the formula:

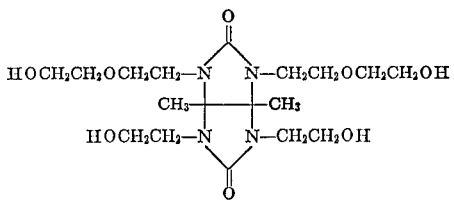

was obtained as an amber colored, very viscous material.

Elemental analysis was as follows: Calculated for $C_{18}H_{34}N_4O_8$ (percent): C, 49.77; H, 7.83; N, 12.90. Found (percent): C, 51.16; H, 8.29; N, 12.54.

The structure was confirmed by IR and NMR analyses.

Other compounds in accordance with the present invention which can be prepared following the procedures of the above examples include

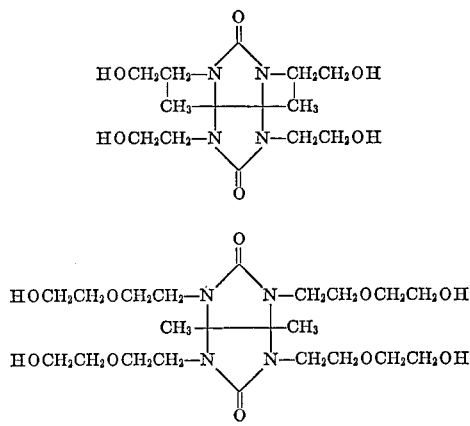

and

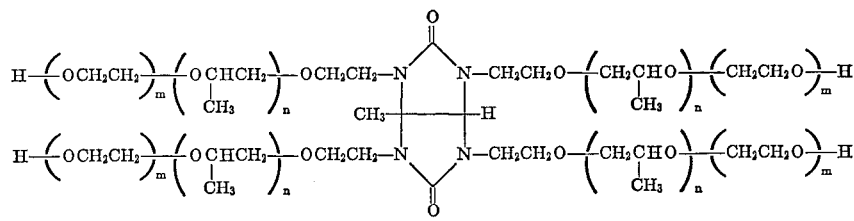

wherein $m$ and $n$ are integers of from 1 to 1,000.

EXAMPLE 11

A rigid polyurethane foam was prepared from 100 parts of the compound of Example 4, 30 parts of fluorotrichloromethane, 2 parts of a silicone surfactant (available as Dow Corning 193 from Dow Corning Corp.), 1.5 parts of N-ethylmorpholine, 0.1 part of a stannous-type catalyst having 28–29% tin, a specific gravity at 25° C. of 1.25 to 1.27 and viscosity at 25° C. of 360 (available as T-9 from M & T Chemicals Inc.) disclosed in U.S. Pat. 3,032,571 and 128 parts of a polymethylene polyphenylisocyanate mixture containing 31% NCO (available as PAPI from the Upjohn Company). All the other ingredients were mixed together rapidly and added to the isocyanate while stirring and poured into a mold. Reaction began in 8–10 seconds, the foam reached maximum volume in 25 seconds and was tack free in 40 seconds.

The resultant foam was fine celled and had the following physical properties:

| ASTM No. | Test | Results |
|---|---|---|
| D1622-63 | Density, lbs./cu. ft. | 2.0 |
| D1621-64 | Compression load, at 10% deflection, p.s.i. | 122 |
|  | Friability index,[1] in.-lb./in. pen. | 52 |
| D2856-70 | Porosity, percent open cells | 6.3 |
| D2326-70 | K-factor | 0.122 |
| D1692-68 | Flammability | S.E. |
| D1692-68 | Burning rate, in./min | 2 |
| D2126-66 | Dimensional stability, percent change: |  |
|  | 24 hours at 70° C., ambient RH | 0.4 |
|  | 24 hours at 110° C., ambient RH | 8 |
|  | 24 hours at 70° C., 100% RH | 8 |

[1] Friability index is measured with a Gardner impact tester having a flat, circular foot one inch in diameter capable of delivering an impact force of 20 in.-lbs. as follows: test specimens are cut having a minimum dimension of 4 inches on a side one inch thick. Five one-inch diameter areas are marked on the foam and thickness measured. The impact tester is dropped onto the marked areas and let stand at rest one hour, when the thickness of the foam is measured again at each marked area. The friability index is the inch-pounds of impact force per inch of penetration, calculated by dividing 20 by the difference between initial and final thickness.

EXAMPLE 12

The procedure of Example 11 was followed except omitting the N-ethylmorpholine and employing as the polyisocyanate a polymethylenepolyphenylisocyanate having 32% NCO content (available as Mondur MR from Mobay Chemical Co.).

After mixing the ingredients, reaction began in 8–10 seconds, the foam reached maximum volume in 30 seconds and was tack free in 40 seconds.

The resultant foam had the following physical properties.

| Test: | Results |
|---|---|
| Density, lbs./cu. ft. | 2.2 |
| Compression load, at 10% deflection, p.s.i. | 108 |
| Friability index, in-lb./in. pen. | 49 |
| Porosity, percent open cells | 4.1 |
| Flammability | S.E. |
| Burning rate, in./min. | 2.1 |
| Dimensional stability, percent change— |  |
| 24 hours at 70° C., ambient RH | 0.4 |
| 24 hours at 110° C., Ambient RH | Poor |
| 24 hours at 70° C., 100% RH | 11 |

EXAMPLE 13

The procedure of Example 11 was followed except omitting the N-ethylmorpholine and the catalyst. After mixing the ingredients, reaction began in 25 seconds, the foam reached maximum volume in 240 seconds and was tack free in about 300 seconds.

The resultant foam had the following physical properties.

| Test: | Results |
|---|---|
| Density, lbs./cu. ft. | 2.1 |
| Compression load, at 10% deflection, p.s.i. | 120 |
| Friability index, in.-lb./in. pen. | 37 |
| Porosity, percent open cells | 9.8 |
| Flammability | S.E. |
| Burning rate, in./min. | 2 |
| Dimensional stability, percent change— |  |
| 24 hours at 70° C., ambient RH | 0.9 |
| 24 hours at 110° C., ambient RH | 10 |
| 24 hours at 70° C., 100% RH | 8 |

We claim:
1. A compound of the formula

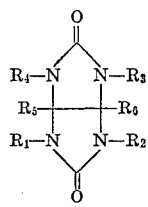

wherein $R_1$, $R_2$, $R_3$ and $R_4$ are hydrogen-terminated oxyalkylene chains of the formula

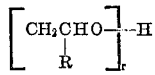

wherein R is selected from the group consisting of hydrogen, methyl, ethyl and phenyl and $r$, which may be the same or different in different $R_1$, $R_2$, $R_3$ or $R_4$ groups is an integer of from 1 to 1000, and $R_5$ and $R_6$ independently are selected from the group consisting of hydrogen and alkyl, of up to 8 carbon atoms.

2. A compound according to claim 1 wherein $R_5$ and $R_6$ are hydrogen or methyl.

3. A compound according to claim 1 wherein $R_5$ is hydrogen or methyl and $R_6$ is hydrogen.

4. A compound according to claim 1 wherein R is hydrogen or methyl.

5. A compound according to claim 1 wherein R, $R_5$ and $R_6$ are hydrogen or methyl.

6. A compound according to claim 1 of the formula

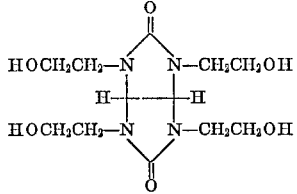

7. A compound according to claim 1 of the formula

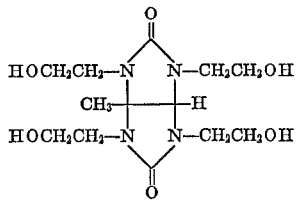

8. A compound according to claim 1 of the formula

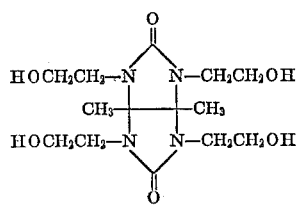

9. A compound according to claim 1 of the formula

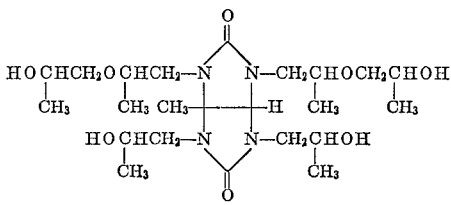

10. A compound according to claim 1 of the formula

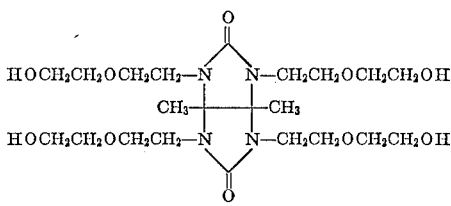

11. A compound according to claim 1 of the formula

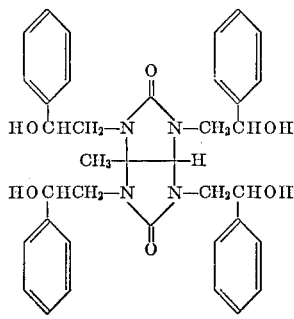

References Cited
FOREIGN PATENTS

| | | | |
|---|---|---|---|
| 36,767 | 9/1956 | Germany | 260—309.7 |
| 623,673 | 7/1961 | Canada | 260—309.7 |

OTHER REFERENCES

Chemical Abstracts Subject Index (A–I), vol. 67, p. 1605S (July–December 1967).

Badische Anilin- & Soda-Fabrik. Chem. Abst., vol. 65, columns 9134–5 (1866).

Bennewitz et al.: Chem. Abst., vol. 68, No. 60415c (1968).

NATALIE TROUSOF, Primary Examiner

U.S. Cl. X.R.

252—50; 260—2.5 A, 2.5 AQ, 75 N, 77.5 AQ, 77.5 C, 77.5 MA